United States Patent [19]

Bouwman

[11] 4,359,794
[45] Nov. 23, 1982

[54] SELF-LOCKING FASTENER AND A STAMP FOR MAKING SAID FASTENER

[75] Inventor: Johannes E. Bouwman, Helmond, Netherlands

[73] Assignee: Nedschroef Octrooi Maatschappij N.V., Helmond, Netherlands

[21] Appl. No.: 224,807

[22] Filed: Jan. 13, 1981

Related U.S. Application Data

[62] Division of Ser. No. 2,229, Jan. 9, 1979, Pat. No. 4,294,300.

[30] Foreign Application Priority Data

Jan. 13, 1978 [NL] Netherlands .......................... 7800432

[51] Int. Cl.³ .............................................. B21D 53/24
[52] U.S. Cl. ....................................... 10/85; 10/86 A; 10/86 F
[58] Field of Search .................. 72/352; 411/185, 187, 411/188; 10/24, 85, 86 A, 111, 113, 120, 120.5, 121, 73, 86 C, 86 F, 75

[56] References Cited

U.S. PATENT DOCUMENTS 1,298,863  4/1919  Baker .
1,952,305  3/1934  Beck .
2,147,209  2/1939  Olson ................................. 411/187
2,328,495  8/1943  Reed .................. 10/86 F X
3,509,521  4/1970  Gutshall .
3,693,685  9/1972  Onufer .

FOREIGN PATENT DOCUMENTS 488692  12/1952  Canada ................... 10/120
621686   4/1927  France .
   948   1/1913  United Kingdom .
154467   1/1919  United Kingdom .
477143  12/1937  United Kingdom .
902366   7/1962  United Kingdom .
902367   7/1962  United Kingdom .
1234131  6/1972  United Kingdom .
1314427  4/1973  United Kingdom .

Primary Examiner—Mark Rosenbaum
Attorney, Agent, or Firm—Pennie & Edmonds

[57] ABSTRACT

A male die for making a self-locking threaded fastener where the die has a planar working surface with a plurality of elongated teeth on the surface. The teeth are arranged in a plurality of groups with the teeth of each group extending parallel to each other and to a tangent to a bore in the die. The crests of the teeth extend above the working surface and the roots of the teeth are below the working surface.

4 Claims, 6 Drawing Figures

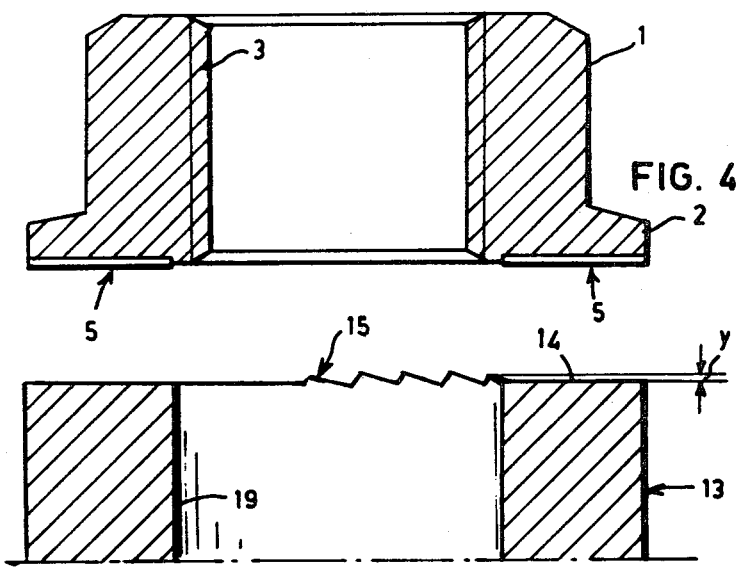
FIG. 4
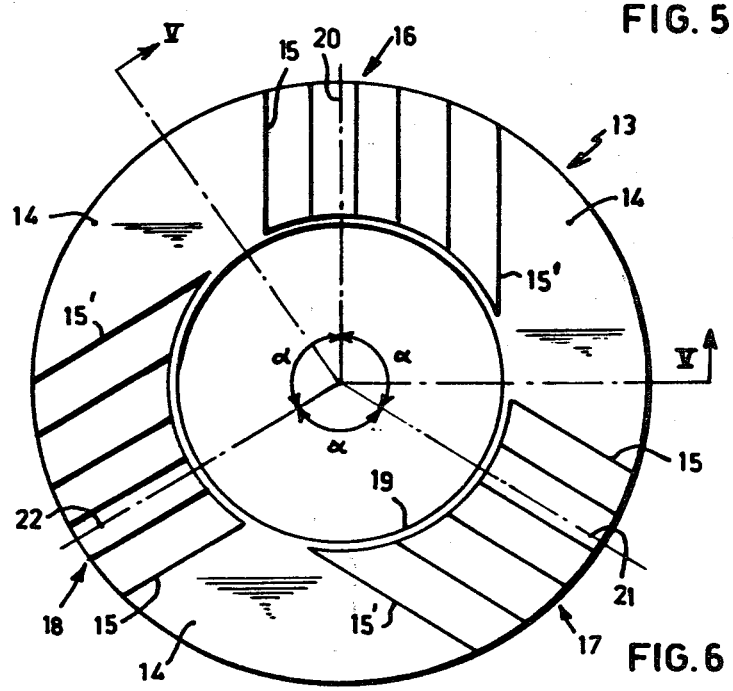
FIG. 5
FIG. 6

SELF-LOCKING FASTENER AND A STAMP FOR MAKING SAID FASTENER

This is a division of application Ser. No. 2,229, filed Jan. 9, 1979, now U. S. Pat. No. 4,294,300.

TECHNICAL FIELD

The present invention relates to a self-locking fastener, particularly a nut, a bolt, a screw or a similar element, and a stamp or male die respectively for making said fastener, said fastener and stamp respectively being provided with teeth at its bearing surface or working surface respectively.

BACKGROUND ART

A self-locking fastener, particularly a nut or a bolt of the above-said type, is known from Dutch patent application No. 70 13558. With said known fastener the bearing surface of the nut or the bolt head is formed at the lower side of a flange, which over the whole periphery extends outside the hexagonal outer surface of the nut or the bolt head. Said bearing surface is provided with an annular row of radial teeth, surrounded at the outer ends by an edge portion of the flange which is not provided with teeth. With said known fastener the crests of the radial teeth are located flush with the smooth edge portion of the flange or with the highest point thereof at the lower side respectively and the height of the teeth increases in radial direction from the axis of the fastener toward the periphery of the flange. With said known toothing of the bearing surface, the spacing of the teeth and therewith the depth of the teeth increases in a direction from the inner diameter of the flange toward the outer diameter of the flange. The crests of the teeth are perpendicular to the axis of the article and are flush therewith in a flat plane. The roots of the teeth enclose an angle with the axis of the fastener and are as it were located on a cone surface. With the known fastener the bearing surface only consists of a narrow ring in the vicinity of the outer periphery of the flange, the shape of which can vary between a flat surface and a cone.

The known fastener possesses relatively long teeth, so that in the friction between the flange and the underlying material a relatively high variation occurs.

The teeth of the known fastener comprise a relatively great maximal height and moreover the bearing surface of the known fastener is relatively small and only in some cases flat. With the known fastener when detaching the same, a relatively small surface is described by a tooth with the same angle of rotation, by which relatively little underlying material is deformed.

As a result of the above characteristics of the known fastener, particularly of its toothing at the bearing surface, said known fastener looses a relatively great deal of its resistance to rotation in the opposite direction during setting.

During the formation of the teeth on the bearing surface of the known fastener by means of a stamp it is necessary, to form the teeth completely in the vicinity of the outer edge of the flange, that the teeth are extra strongly pressed at the inner edge of the flange. Therefore a much higher stamping pressure is needed at the inner edge of the flange than in the vicinity of the outer edge of the flange. With the production of the known fastener the useful life of the stamp will be relatively short for that reason.

The object of the present invention is to remove said objections against the known fastener and the stamp respectively for making said fastener.

DISCLOSURE OF INVENTION

This object is reached, in that according to the invention the teeth are located in a number of separate groups, in that in each group the teeth are mutually parallel and in that the height of the teeth remains equal over their complete length and is greater than the axial distance between the bearing surface and working surface respectively and the roots of the teeth.

The result of this construction is that in the fastener and stamp used for making said fastener the crests and the roots of the tooth profile are located perpendicularly to the axis of the fastener and the stamp respectively namely because the space between the teeth is constant over their complete length. Thereby the crests and the roots of the teeth are located in two parallel flat planes perpendicularly to the axis of the fastener and the stamp respectively. As the teeth are located in a number of separate groups, flat surfaces which are not provided with teeth are formed between the groups of teeth on the bearing surface, said flat surfaces being located perpendicularly to the axis of the fastener and the stamp respectively. The toothing of the fastener and the stamp respectively according to the present invention, has a shorter total tooth length than the known fastener, by which in the friction between the fastener and the underlying material less variations occur. The variations as for the resistance to rotation in the opposite direction at constant tightening torque is lower with the fastener according to the invention than with the known fastener. The fastener and the stamp respectively according to the invention has with the same size a smaller maximal tooth depth than the known fastener and moreover the bearing surface of the present fastener is greater and flatter than with the known fastener. With the fastener according to the invention a greater surface is described by a tooth than with the known fastener at the same angle of rotation when detaching same and at the same angle of rotation more underlying material is deformed, by which the present fastener will lock itself in a quicker way in the underlying material than the known fastener. Due to the above three constructive points of difference the present fastener looses less resistance to rotation when setting than the known fastener. When making the present fastener almost the same pressure arises at the stamp when forming the teeth, as the shape of the tooth to be formed is the same at every location. The useful life of the stamp will be longer for the manufacture of the present fastener than that for the manufacture of the known fastener.

In the preferred embodiment of the fastener and the stamp respectively according to the invention the outer teeth of adjacent groups are equally spaced from one another and the longest tooth of each group extends tangentially to the outer periphery of the screw thread in or on the fastener respectively.

Thereby, relatively great flat bearing surfaces are formed between the groups of teeth, said surfaces extending over the complete width of the annular bearing surface of the fastener and the stamp respectively.

In a particularly effective embodiment of the fastener and the stamp respectively according to the invention the groups of teeth are equally distributed about the periphery of the bearing surface and working surface respectively.

In the fastener and the stamp respectively according to the invention preferably three groups of teeth have been formed, in which the peripheral angle between the radii, drawn parallel to the teeth through the groups, each time amounts to 120°.

BRIEF DESCRIPTION OF THE DRAWINGS

The invention will be further elucidated by way of example, with reference to the accompanying drawings.

FIG. 4 is a cross section according to the line IV—IV in FIG. 2.

FIG. 5 is a partial cross section along the line V—V in FIG. 6 of the stamp for making said fastener according to the invention and FIG. 6 is a top view of the stamp according to FIG. 5.

BEST MODES FOR CARRYING OUT THE INVENTION

Figure 1:
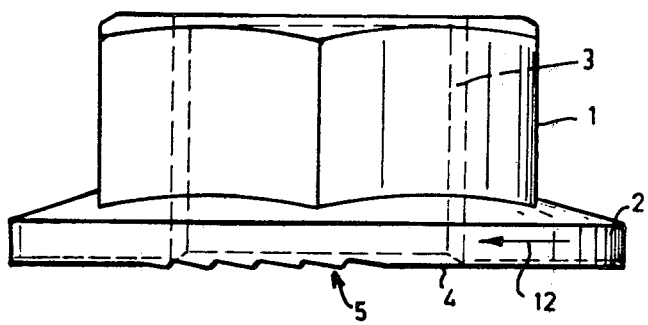
FIG. 1 is a side view of the fastener according to the invention in the shape of a flanged nut.

The fastener according to the invention in the shape of a flanged nut, illustrated in FIG. 1 through 4, comprises a nut body 1 and a ring flange 2, mounted to the lower side of the nut body 1, in which the nut body is provided in its bore with a screw thread 3. At the lower side of the ring flange 2 the bearing surface 4 is formed.

The bearing surface 4 is provided with tooth 5, in which the teeth 5 have been formed in three separate groups 6, 7 and 8. The teeth 5 are mutually parallel in each group and the height of the teeth 5 remains equal over their complete length and is greater than the axial space between the bearing surface 4 and the roots of the teeth, so that the teeth 5 extend with their crests beyond the bearing surface as appears from the FIG. 1, 3 and 4. Thereby the crests of the teeth 5 and the roots of the teeth 5 are located in parallel surfaces perpendicular to the axis of the fastener. The width of the teeth 5 is equal over their complete length and all teeth 5 have the same width. The height, over which the teeth 5 extend beyond the bearing surface 4, is indicated with x in FIG. 3, wherein x can amount to 0.06 –0.09 mm.

Figure 2:
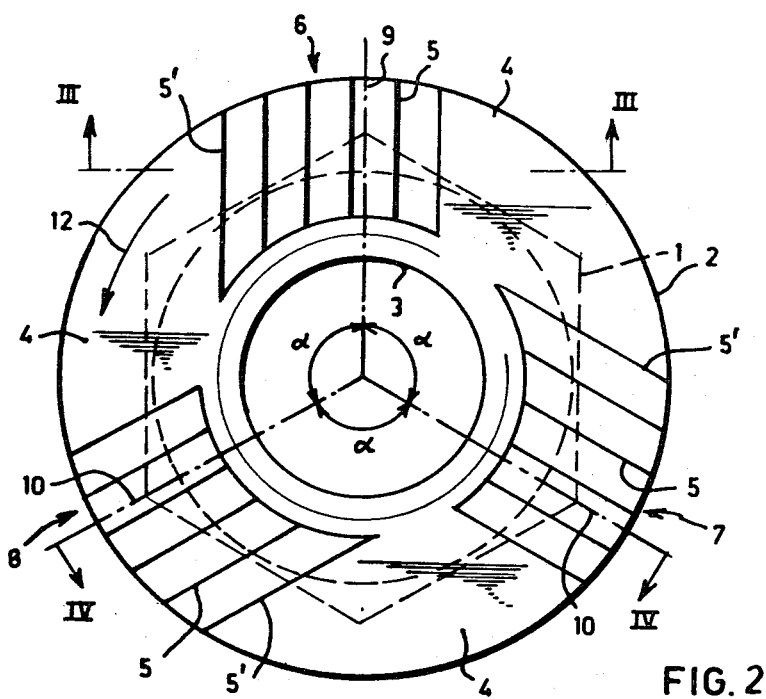
FIG. 2 is a view from below of the fastener according to FIG. 1.
Figure 3:
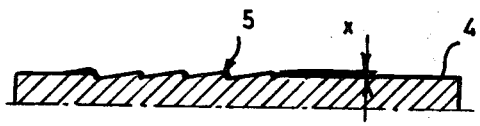
FIG. 3 is a cross section according to the line III—III in FIG. 2.

It appears from FIG. 2, that the outer teeth of adjacent groups are spaced from each other and that the longest tooth 5' of each group extends tangentially to the outer periphery of the screw thread 3 in the fastener. In the example of the fastener according to FIG. 1, 2, 3 and 4 five teeth are mounted in each group, but this number can of course be higher or lower.

According to the invention the groups 6, 7 and 8 of teeth 5 are furthermore equally distributed about the periphery of the bearing surface 4 in which according to the invention three groups of teeth have been formed, in which the peripheral angle α between the radii 9, 10 and 11 drawn parallelly to the teeth 5 through the groups 6, 7 and 8 respectively, each time amounts to 120°.

The arrow 12 in the FIG. 1 and 2 indicates the direction for tightening the fastener.

In the preferred embodiment of the fastener according to the invention in the shape of a flanged nut, illustrated in FIG. 1, 2, 3 and 4, three great flat bearing surfaces 4 are formed at the lower side of the ring flange. By making the number of teeth 5 or the number of groups of teeth higher or lower, the surface of the flat bearing surfaces 4 can be increased or decreased respectively.

The fastener according to the invention in the FIG. 1 through 4 is illustrated in the shape of a flanged nut, but the invention can of course also be applied to a bolt with a hexagonal or other polygonal head, in which the head is provided with a ring flange at the lower side. Thereby the bore in the nut with the screw thread 3 is replaced by a shank with external screw thread projecting beneath the bearing surface 4. The bearing surface 4 of the bolt head is in the same way provided with teeth 5 as described above and indicated in FIG. 1 through 4. The invention can of course be applied with a screw or an other similar fastener.

The present invention also relates to a stamp or male die for making a fastener, said stamp 13 being illustrated in FIG. 5 and 6. The stamp 13 of which in FIG. 5 only the upper portion is drawn, is provided with a working surface 14 on which teeth 15 are formed. The stamp is made hollow and is provided with a bore 19, the diameter of which substantially corresponds to the outer diameter of the screw thread in the fastener 1, drawn in FIG. 1 through 4.

The teeth 15 of the stamp 13 have the same shape as the teeth 5 of the fastener according to the FIG. 1 through 4 but of course are complementary with said teeth. The teeth 15 are formed in three groups 16, 17 and 18 of each five teeth, in which the radii 20, 21, 22 drawn parallelly to the teeth through the groups 16, 17 and 18, mutually enclose a peripheral angle of 120°. As shown, the longest tooth 15' of each group extends tangentially to the outer periphery of the bore 19. Also in the stamp 13 according to the FIG. 5 and 6 the teeth project with their crests above the working surface 14, in which the height y over which the teeth project beyond the working surface, can be equal to the distance x, over which the teeth 5 project beyond the bearing surface 4 with the fastener according to the FIG. 1 through 4.

What is claimed is:

1. A male die for making a self-locking threaded fastener where the die has a planar working surface with a plurality of elongated teeth thereon, characterized in that the teeth are located in a plurality of groups in that the die is in the form of an annulus having a bore, in that the teeth in each group extend parallel with each other, in that a tooth on an edge of each group extends tangentially to the bore, in that the teeth have a height which is the same over the entire length of the teeth, in that the teeth extend above said working surface, and in that the teeth have roots which are disposed below said working surface.

2. A male die according to claim 1 characterized in that said groups are symetrically positioned about a periphery of said working surface.

3. A male die according to claim 1 characterized in that a peripheral angle between radii of the male die drawn parallel to the teeth of each group comprises 120°.

4. A male die for making a self-locking fastener where the die is in the form of an annulus having a bore and having a planar working surface with teeth thereon, characterized in that the teeth are located in a plurality of groups with the teeth of each group extending parallel to each other, in that the teeth have a height which is the same over the entire length of the teeth, in that the teeth extend above said working surface and have roots which are disposed below said surface, in that a tooth on an edge of each group of teeth extends tangentially to an inner diameter of the annulus and has a length greater than a radial distance between a peripheral edge of the working surface and the bore, and in that said groups are symetrically positioned about a periphery of said working face whereby a peripheral angle between radii of the fastener drawn parallel to the teeth in each group comprises 120°.

* * * * *